(12) United States Patent
Zhang et al.

(10) Patent No.: US 7,634,645 B2
(45) Date of Patent: Dec. 15, 2009

(54) METHOD AND SYSTEM TO REQUEST REMOTELY ENABLED ACCESS TO INACTIVE SOFTWARE OPTIONS RESIDENT ON A DEVICE

(75) Inventors: Kun Zhang, Waukesha, WI (US); Karamjeet Singh, Germantown, WI (US); William G. Blair, Waukesha, WI (US); Winnie C. Durbin, Dousman, WI (US); Michael R. Minogue, Milwaukee, WI (US); Geoffrey S. Christanday, Milwaukee, WI (US); Esmeraldo R. V. Davantes, Pewaukee, WI (US)

(73) Assignee: GE Medical Technology Services, Inc., Pewaukee, WI (US)

( * ) Notice: Subject to any disclaimer, the term of this patent is extended or adjusted under 35 U.S.C. 154(b) by 2072 days.

(21) Appl. No.: 09/681,483

(22) Filed: Apr. 13, 2001

(65) Prior Publication Data

US 2002/0152401 A1    Oct. 17, 2002

(51) Int. Cl.
*G06F 9/00* (2006.01)
(52) U.S. Cl. .......................................................... 713/1
(58) Field of Classification Search ................ 713/184, 713/200, 201, 1, 100, 182; 700/9; 709/221, 709/222, 217; 710/8, 10; 705/59; 715/810
See application file for complete search history.

(56) References Cited

U.S. PATENT DOCUMENTS

| | | | | |
|---|---|---|---|---|
| 5,199,066 A | * | 3/1993 | Logan | 713/200 |
| 5,259,029 A | * | 11/1993 | Duncan, Jr. | 713/184 |
| 5,442,541 A | * | 8/1995 | Hube et al. | 700/9 |
| 6,301,666 B1 | | 10/2001 | Rive | |
| 6,381,557 B1 | * | 4/2002 | Babula et al. | 702/183 |
| 6,490,684 B1 | * | 12/2002 | Fenstemaker et al. | 713/182 |
| 6,581,069 B1 | * | 6/2003 | Robinson et al. | 707/104.1 |
| 6,672,505 B1 | * | 1/2004 | Steinmetz et al. | 235/379 |
| 6,694,384 B1 | * | 2/2004 | Moeller et al. | 710/8 |
| 6,698,021 B1 | * | 2/2004 | Amini et al. | 725/105 |
| 6,829,704 B2 | * | 12/2004 | Zhang et al. | 713/1 |

* cited by examiner

*Primary Examiner*—Beemnet W Dada
(74) *Attorney, Agent, or Firm*—Ziolkowski Patent Solutions Group, SC

(57) ABSTRACT

A system and method are provided for requesting remotely enabled access to inactive software options resident on a device. A graphical user interface (GUI) is electronically linked to a centralized facility remotely located from the device. Option identifying parameters, such as a user ID, host ID, system ID, modality selection, and option selection are entered using the GUI and transmitted via an electronic request to the centralized facility. In response to the received request, the centralized facility generates a software key and transmits same to the device for activation of the option if approved by the centralized facility.

15 Claims, 3 Drawing Sheets

METHOD AND SYSTEM TO REQUEST REMOTELY ENABLED ACCESS TO INACTIVE SOFTWARE OPTIONS RESIDENT ON A DEVICE

BACKGROUND OF INVENTION

The present invention relates generally to software option enablement, and more particularly, to a method and system to request access to software options resident in memory of a device.

Data exchange between a centralized facility and remote medical diagnostic devices and supporting systems, such as medical imaging systems, has steadily increased in recent years. Examples of systems capable of exchanging data remotely include magnetic resonant imaging (MRI) systems, computed tomography (CT) systems, ultrasound and x-ray systems, nuclear and echocardiography systems, and positron emission tomography (PET) systems. Typically, these systems are pre-manufactured to have a multitude of installed but inaccessible software options that may or may not be utilized by a customer or user. Some known systems permit the user to configure a device according to the user's needs, but these systems require advanced user input as to what features are needed for future use. To further complicate matters, additional devices are purchased by customers who then desire to network the devices, even though accessible options on the devices may vary.

Further advancements in the field of information exchange provide remote service to medical diagnostic systems in an effort to allow a level of service on a continual and interactive basis as needed by many facilities. In one such system, a facility can interactively receive messages via a network and can respond automatically to the messages if configured correctly. Data required to analyze a state of operation of the medical diagnostic devices can be transferred and immediately stored for use during an electronic connection. This technique greatly facilitates identification of system problems, permits inquires to be posed to the centralized facility, facilitates rapid transfer of updates and imaging protocols, and permits standard and customized reports to be automatically transmitted to user systems or facilities without further user input or acceptance. The non-user interactive aspect of this technique allows the medical diagnostic facility to remain current on services provided by the centralized facility and to readily communicate with the facility. While such advancements and the provision of remote services to medical diagnostic devices have greatly enhanced the level of service and data exchange, they have not eliminated the need to physically send service technicians to the device locations to enable inaccessible device options.

Known systems of device activation provide a mechanism wherein a user can contact a centralized facility via telephone, fax, email, or regular mail and place an order or request for activation of an option. The request is then processed at the centralized facility and a service technician is scheduled to travel to the physical location of the device, wherein a key enabling the option is installed. Since service calls are normally conducted during device operation periods, a service call results in unnecessary delay and device down time while installation of the software key or code on the device is completed. Further, the user is limited as to when installation of the code to enable the option can occur. Even if demand for usage of the device peaks around the date of the service call, it is generally not economical or efficient for a user to reschedule the service call. Rescheduling will further delay access to options and possibly require patient rescheduling for use of the inaccessible option. Additionally, costs associated with the cancellation and rescheduling of service calls are prohibitive.

It would therefore be desirable to design a method and system to request remotely enabled access to inactive software options resident on a remote device via a computerized system and eliminating the need for physical visitation to the device by service personnel.

SUMMARY OF INVENTION

The present invention is directed to an automated system and method to request access to software options on a device remotely located from a centralized facility over a complete system that in turn enables the software overcoming the aforementioned problems.

The present invention includes hardware and software to enable non-enabled or inactive software options stored in memory of the device, such as a medical imaging scanner. The system comprises a computer located at a remote centralized facility and configured to display selection data to a user in the form of a graphical user interface (GUI). The remote centralized facility is electrically connected to the device and is further capable of transmitting data to the device. The centralized facility is connected to the device through an external communication network, such as the Internet, direct dial-up links, or a wireless platform. The remote centralized facility includes a computer programmed to receive a user ID input, identify a user selected software option or application desired to be activated, and receive a request for activation of the identified option. The computer then processes the information and, if appropriate, generates a software enabler designed to permit access to the requested option and transmits the enabler from the centralized facility to the device. Transmission of the enabler can occur by email, direct download through the external communications network, transmission over a public or private communication line, or any other viable transmission means.

In accordance with the process of the present invention, a method to access one or more inactive options resident on a device located remotely from a centralized facility is disclosed that includes accessing a graphical user interface electronically linked to the centralized facility and configured to facilitate a selection of a number of option identifying parameters. The parameters define a specific request and can include one or more identifiers identifying the client, user, host, system, modality, period of use, and/or option requested to be activated. In this manner, the specific customer or user requesting access to a device option on a specific machine can be identified and monitored. Further, a user may be limited in the type of options available for activation depending on the modality selected, period of usage, and regulatory requirements. The method further includes selecting one or more of the option identifying parameters to identify a selected inactive option resident on the device, and transmitting a request for activation of the selected inactive option to the centralized facility.

In accordance with another aspect of the present invention, a computer data signal embodied in a carrier wave and representing a set of instructions which, when executed by a processor, will cause the processor to access a GUI configured to facilitate a request to enable an inaccessible option resident on a device and to allow input of a device identifier is disclosed. The device may include a variety of machines, such as a magnetic resonance imaging scanners, x-ray devices, ultrasound devices, and positron emission tomography devices. The device identifier provides information regarding the specific device model, serial number, owner of the device, and the physical location of the device. The data signal also causes the processor to select a usage period and one or more inactive options resident on the device to be enabled, and authorizes a remote centralized processing station to generate a code configured to enable one or more of the selected options. The usage period can be for limited access, indefinite, pay-per-use basis, or trial basis periods. In alternative embodiments, the code can be further defined to include information related to at least one of a user ID, client ID, password, host ID, system ID, facility ID, device modality, and a selected software package.

In accordance with yet another aspect of the invention, a GUI to request activation of an inactive software program is disclosed comprising a device modality selector, a system identification field, a user identification field, a software program selector, and a software key generation tab. User selection of the software key generation tab causes a data transmission or request to a centralized processing center for activation of the inactive software program resident on the device. In an alternative embodiment, a generate-and-receive tab can be utilized to generate the request and authorize generation of an activation key at the centralized facility which is then automatically transmitted to the device.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

Figure 1:
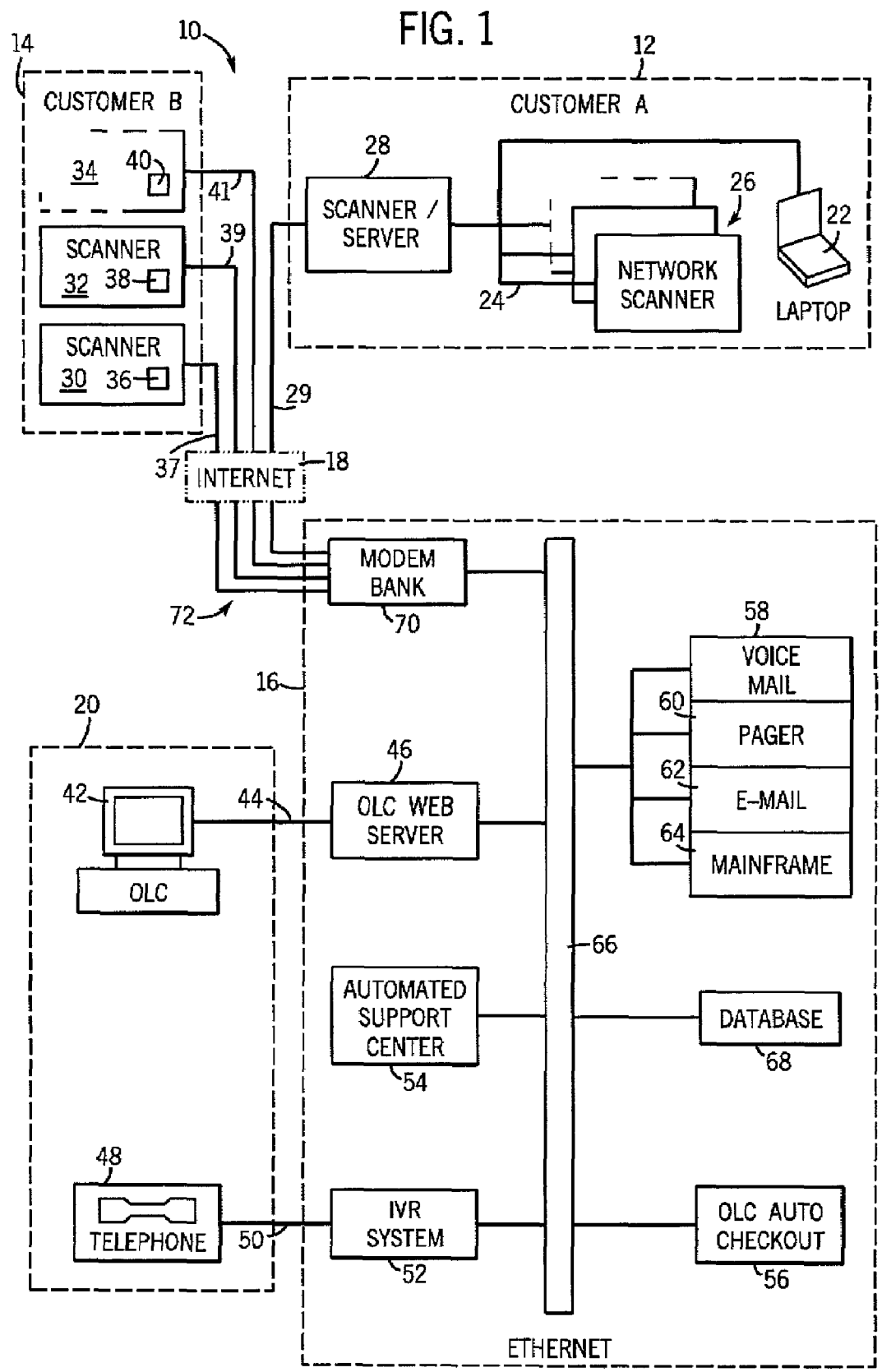
FIG. 1 is a block diagram of a system for which the present invention is implemented therein.

Referring to FIG. 1, an overview block diagram of a medical diagnostic and service networked system 10 is shown which includes a plurality of remote user or customer stations, such as Customer A referenced with numeral 12, and Customer B referenced with numeral 14. It is understood, that the number of user stations can be limitless, but two specific embodiments are shown with Customer A and Customer B, which will be further explained hereinafter. The user stations 12, 14 are connected to a receiving center or centralized facility 16 through a communications link, such as a network of interconnected server nodes 18 or a remote link 20. Although a single centralized facility is shown and described, it is understood that the present invention contemplates the use of multiple centralized facilities or processing centers, each capable of communication with each user station. Each user station has operational software associated therewith which can be configured, serviced, maintained, upgraded, monitored, enabled or non-enabled by the centralized facility 16.

The various systems disclosed are configured to be selectively linked to the centralized facility 16 by either the remote link 20, or in the example of user station 12, a laptop computer 22 connected to an internal network 24 of Customer A. Such selective linking is desirable to provide upgrades, maintenance, service, and general monitoring of the various systems and equipment at a customer site, which includes accessing data from the systems and transmitting data to the systems, for example.

In general, a customer site may have a number of devices such as a variety of medical diagnostic systems of various modalities. As another example, in the present embodiment, the devices may include a number of networked medical image scanners 26 connected to an internal network 24 served by a single scanner 28 having a workstation configured to also act as a server, or configured as a stand-alone server without a medical image scanner associated therewith. Alternately, a user station, or customer site 14 can include a number of non-networked medical image scanners 30, 32, and 34 each having a computer or work station associated therewith and having an internal modem 36, 38, and 40 to connect the remote user station to a communications link, such as the Internet 18 through links 37, 39, and 41, respectively, to communicate with the centralized facility 16. Internet 18 is shown in phantom to indicate that an external communications network can include Internet 18, together with communication links 29, 37, 39, and 41, or alternatively, can include direct dial-up links through dedicated lines, an intranet, or public/private communication systems.

It is understood that each of the network scanners 26 has its own workstation for individual operation and are linked together by the internal network 24 so that the user can have a centralized management system for each of the scanners. Further, such a system is provided with communications components allowing it to send and receive data over a communications link 29. Similarly, for the non-networked medical image scanners at remote user station 14, each of the scanners 30, 32, and 34 have individual communications links 37, 39, and 41. Although FIG. 1 shows each of these links connected through an open network 18, these links can permit data to be transferred to and from the systems over a dedicated network as well.

The embodiment shown in FIG. 1 contemplates a medical facility having such systems as magnetic resonance imaging (MRI) systems, ultrasound systems, x-ray systems, computed tomography (CT) systems, nuclear systems, cardiology systems, positron emission tomography (PET) systems, or any other type of medical imaging system, however, the present invention is not so limited. Such facilities may also provide services to centralized medical diagnostic management systems, picture archiving and communications systems (PACS), teleradiology systems, etc. Such systems can be either stationary and located in a fixed place and available by a known network address, or be mobile having various network addresses varying for different geographic or physical locations of the device. In the embodiment shown in FIG. 1, each user station 12, 14 can include any combination of the aforementioned systems, or a user station may have all of a single type of system. A user station can also include a single medical image scanner. Mobile diagnostic systems can be configured similarly to that of user station 12 or user station 14. Such mobile diagnostic systems can include equipment of various modalities, such as magnetic resonance, computed tomography, ultrasound, echocardiography, nuclear, positron emission tomography, picture archiving and retrieval, or x-ray systems and are mobilized in order to service patients or subjects at various medical facilities.

A request for access to and enablement of software options or programs of the present invention can be initiated by any authorized personnel, such as an on-line engineer or technician, or a customer administrative personnel from a computer or workstation 42 in the remote link 20, which can be a part of the centralized facility 16, or be separately connected to the centralized facility 16 by a dialup link 44 to a web server 46 in the centralized facility 16. Alternatively, it is contemplated that the system could be initialized by a laptop computer 22 connected to a customer internal network 24, or individually connected to each of the scanners 30, 32, or 34. The remote link 20 can also serve to connect the centralized facility 16 to a user station by a telephone and telephone connection 48 through a conventional telephone network 50 and to an interactive voice recognition system (IVR) 52 in the centralized facility 16. The centralized facility 16 includes a number of processing systems including computers for the IVR system 52, an automated support center 54, the web server 46, and an auto checkout server 56, for processing customer and product data and creating an appropriate configuration file. Other processor systems include computers to maintain a voicemail system 58, a pager system 60, an email system 62, and a main frame 64, and more generally, an output report generator and notifier. Each is connectable and can transmit data through a network, such as an Ethernet 66 with one another, and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touchtone telephone 48. A bank of modems 70 is connected to the Ethernet 66 to relay data from the centralized facility 16 to the remote user stations 12, 14 through a plurality of modem links 72.

As previously discussed, each of the systems and substations described herein and referenced in FIG. 1 may be linked selectively to the centralized facility 16 via a network 18. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 16. The systems are provided with interactive software so as to configure the systems and exchange data between the user stations and the centralized facility 16. In some cases, during periods when no data is exchanged between the user stations and the centralized facility, the network connection can be terminated. In other cases, the network connection is maintained continuously.

The present invention includes a method and system for granting access to a non-enabled software application resident in memory of a device. As previously indicated, the device, including medical imaging equipment, includes installed software that controls applications or options that are typically installed or deleted manually by a field engineer on-site in response to a request or order from a customer or user. The present invention removes the need for a service technician to physically install new software applications and further allows for configuration of a device based upon a consumers flexible needs by providing a method and system that allows an authorized user to automatically request access to inaccessible options via a GUI.

From a centralized facility, and after appropriate authentication of the user and validation of a set of option identifying parameters, a software enabler is generated in response to the request at the centralized facility 16 and electronically transmitted to a device via communication links 29, 37, 39, 41, and/or 72, FIG. 1, preferably over a private communication link, but other public communications systems can work equally well, such as direct dial-up, Internet, or wireless communications. As previously set forth, it is understood that the external communications links include a closed intranet system, a private communication interface, an open public communications system/interface, or a combination thereof.

Figure 2:
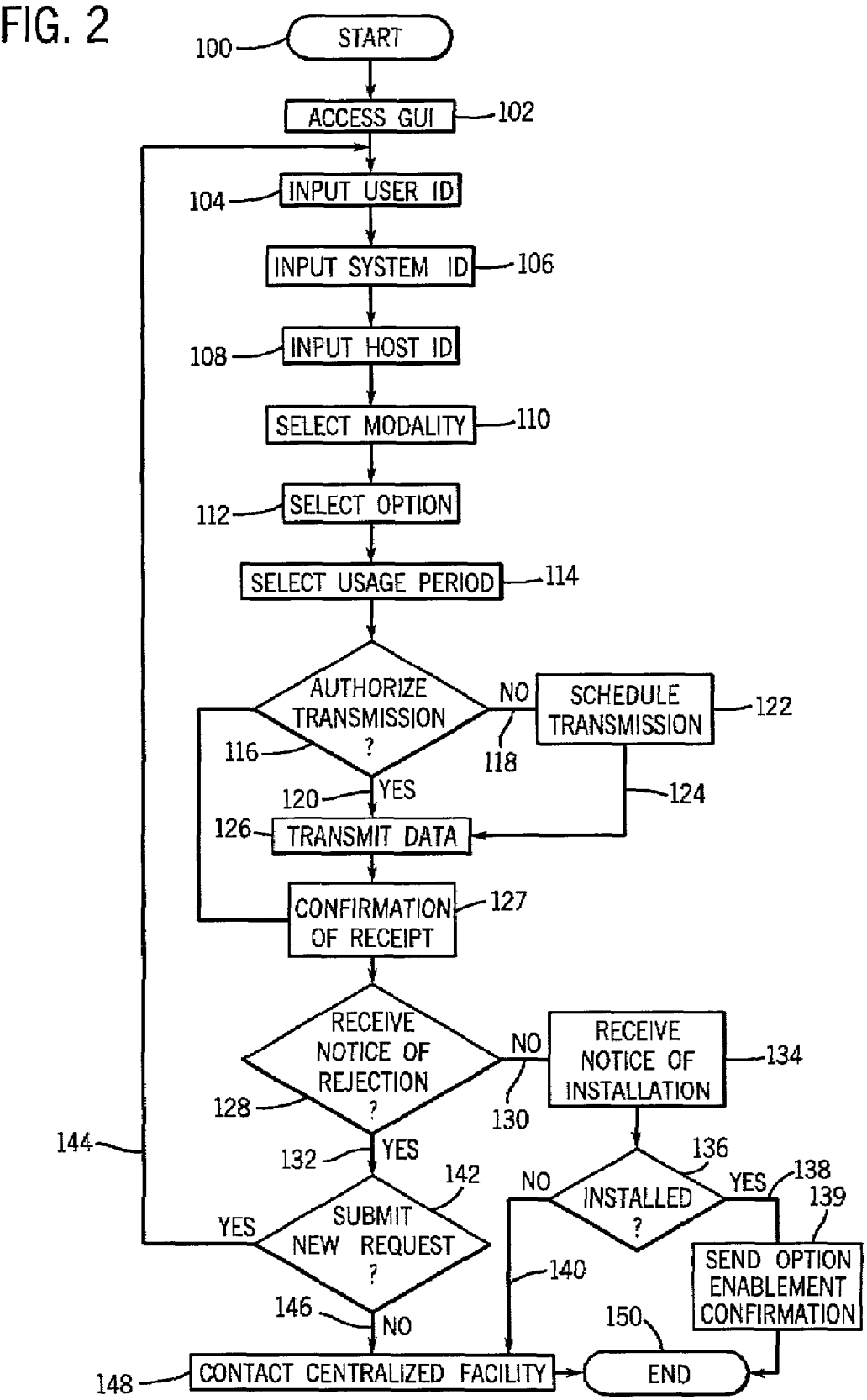
FIG. 2 is a flow chart showing a process of the present invention and implemented in the system of FIG. 1.

Referring to FIG. 2, a flowchart illustrating the steps of a method and acts associated with a computer data signal in accordance with the present invention are shown. The method and/or computer program is initiated at 100 by a customer or user who attempts to logon or access a GUI at 102. Logon requires the user or an authorized field engineer to input electronically a client ID and an authentication code, such as a password, at a remote customer station or remote link with access to the GUI. The centralized facility then validates the client ID and password. If the client ID and password are not validated, the user is prompted to re-enter a new client ID and password and the method starts again at 100. If a valid user ID is not received, a request will never be generated by the GUI.

After access to the GUI is granted 102, the user inputs a User ID 104. The user ID may be identical to the client ID and identify a customer, or be specific to a user authorized by the client to submit a usage request. The user inputs a system or device ID 106 having the to be activated software option resident thereon. The user then inputs a host ID 108 that identifies the physical or geographical location of the device. The host ID may indicate a particular location of a health care facility or indicate the whereabouts of a movable device that is configured to receive an enabling feature via a wireless platform, dial-up, Internet, intranet or any other electronic transmission and reception technology. For instance, the centralized facility processing the request may appoint a separate facility for wireless transmissions of the enablement key.

After inputting the host ID 108, the user selects a modality at 110. The modality 110 defines a general technology area, such as magnetic resonance imaging, computed tomography, computed radiology, positron emission tomography, x-ray, ultrasound, nuclear medicine, echocardiography, picture archiving and retrieval or any other device technology. After the selection of the modality, one or more options or programs are chosen 112 as well as a usage period 114. The usage period 114 can be of an indefinite, pay-per-use, limited-access, or a trial period duration depending on the needs and selections of the user. Although the above steps 104-114 have been provided in a preferred order, the present invention contemplates permutations and/or combinations of the above steps and order to enter input data and selections for a specified request. Further, it is contemplated that accessing certain user stations designed for use with a specific device are pre-programmed to enter input and selection data specific to the device.

After the input and selection data are completed, the process determines when to authorize transmission 116 of the data 104-114 to the centralized facility. If the user decides to delay transmission 118, then the system schedules a later date for data transmission 122. The system then exits at 124, and the technique proceeds to transmit the data 126 at the scheduled time. If the user authorizes immediate transmission 116, 120, then the data 104-114 is transmitted 126, and the user receives a confirmation of receipt at 127. In a preferred embodiment, the data transmission or request 126 is via a public communication interface, such as the Internet. If a confirmation is not received, the user may exit the program or reattempt transmission at 116.

The centralized facility, in response to the received request, may determine that rejection of the request is proper. If so, a notice of rejection is received by the user at 128. The present invention contemplates nearly instantaneous notification of request rejections. However, notification via an electronic mail message, fax, or other forms of communication is well within the scope of the present invention.

If the notice of rejection is not received 130, then a notice of software key installation message at the user and/or device location is received at 134 evidencing an attempt to install the software key. A determination is then made whether the software key is properly installed 136, and if so 138, the algorithm sends a confirmation that the option is enabled 139 and the method ends at 150. If it is determined that the software key is not properly installed 136, 140, then the user receives a prompt to contact the centralized facility at 148 to obtain further assistance and exits the requesting process at 150. In a preferred embodiment, the software key is transmitted from the centralized facility to the device location via a private communication interface that electronically connects the centralized facility to the device.

If a notice of rejection is received 128, 132, the user may elect whether to submit a new request 142. If the user decides to submit a new request, the user returns to 104 to re-enter data related to the user, host, and system identifier and further selects a modality and option in accordance with the step acts heretofore discussed. If the user declines to submit a new request 142, 146, the user may elect to contact the centralized facility 148 for further assistance and terminate the request at 150.

Figure 3:
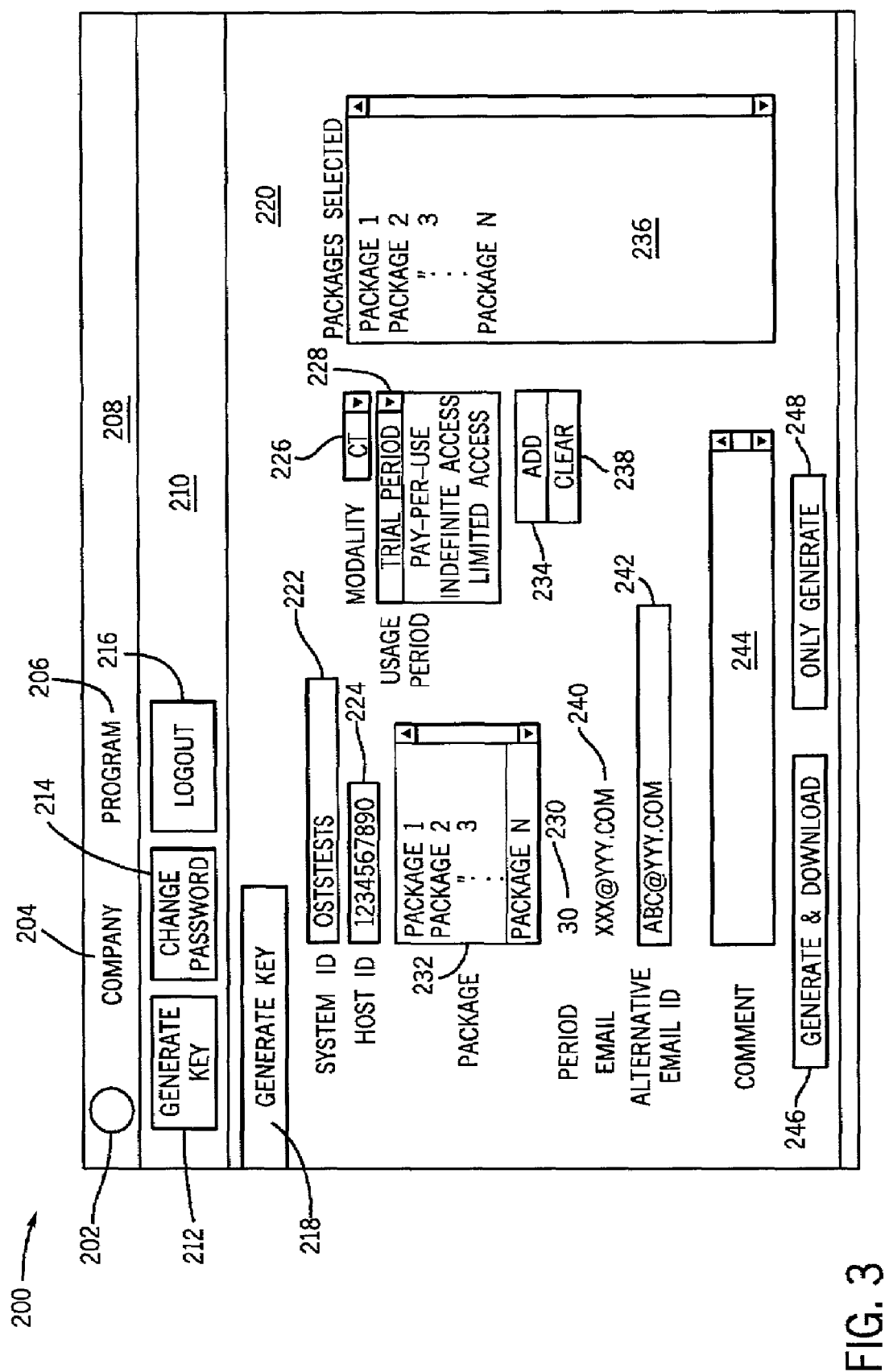
FIG. 3 is a representation of a graphical user interface used to activate an inactive software program resident in memory of a device remotely located from a centralized facility in accordance with the present invention.

Referring now to FIG. 3, a representation of a graphical user interface (GUI) 200 to facilitate the input and selection of data in accordance with the present invention is depicted. In a preferred embodiment, the GUI is designed to include a company icon or logo 202, a company name identifier 204, and a program name 206 along a topmost portion 208 of the GUI. An activation bar 210 located below and adjacent to the topmost portion 208 of the GUI is configured to include a generate key tab 212, a change password tab 214, and a logout tab 216, respectively. The GUI 200 further includes a topic identifier 218 that may be used as a title for the GUI 200. A lower portion 220 of the GUI is configured to permit the entering of the input and selection data, and contains a system ID field 222 and a host ID field 224. The lower portion further contains drop-down menus for selecting a modality 226 and selecting a usage period 228. Upon selection of one of a trial period, pay-per-use, limited access, or indefinite access usage period, a period of use identifier 230 displays the selected time duration of access to the selected software option.

Selection of one of the displayed options in drill down menu 232 requires the user to identify a software package desired to be activated for a given device. The selection of the system ID 222, host ID 224, and modality 226 pre-determines the possible program selections 232 available for activation. The user may select one or more programs desired to be activated by computer keyboard or mouse highlighting of the program package 232 and then clicking or selecting the add tab 234. The selected package is then displayed in package selection field 236. If an error occurs during the selection process or a different program is desired, the user may highlight the option in the package selection field 236 and select the clear tab 238 to delete the selection. In this manner, one or more options may be selected for activation.

A field is included for a primary user email address 240 that may be automatically displayed after accessing the GUI and provided to the centralized facility upon a request submission for email communication with the user. Additionally, an alternative email address or ID 242 can be provided by the user, if necessary. Additionally, a comment dialog box 244 is provided to permit the sending of user remarks to the centralized facility upon selection of the key generation and transmit tab 246 or key generation tab 248.

User selection of the key generation and transmit tab 246 causes the centralized facility to process the data entered via the GUI and, if acceptable, transmit the software key to the selected device for automatic activation of selected options. Selection of the key generation tab 248 results in the user entering a later date and time for transmission of the request data to the centralized facility which then generates the software key and transmits it to the selected device on such date. In an alternative embodiment, the selection of the key generation tab 248 can verify upon clicking whether the data is acceptable for key generation, and if not, notify the user of the rejection in advance of data transmission.

Accordingly, the present invention includes a method to access one or more inactive options resident on a device remotely located from a centralized facility. A graphical user interface (GUI), electronically linked to the centralized facility, and configured to facilitate a selection from a number of option identifying parameters, is accessed by a user. The parameters define a request and can include one or more identifiers identifying the client, user, host, system, modality, period of use, and/or option requested to be activated. The method further includes selecting at least one of the number of option identifying parameters for identification of one or more inactive option resident on the device, and transmitting an electronic request for activation of the selected inactive options to the centralized facility.

The invention further includes a system to grant access to at least one non-enabled software application comprising a computerized network, a device having at least one non-enabled software application resident in memory of the device, and a plurality of computers connected to the computerized network. At least one of the plurality of computers is configured to display selection data to a user in the form of a graphical user interface. The system further comprises a remote centralized facility electronically connected to the device and having a database and a computer, wherein the computer is programmed to receive a user ID input and identify a user selection of at least one non-enabled software application. The centralized facility computer is further programmed to receive a request from an authorized user requesting enablement of the at least one software application resident in memory of the device, and then generate a software enabler designed to permit access to the selected non-enabled software application in accordance with the received request, and transmit the software enabler from the centralized facility to the device.

Accordingly, the invention also includes a computer data signal embodied in a carrier wave and representing a set of instructions which, when executed by at least one processor, causes the at least one processor to display a GUI configured to facilitate a request to enable an inactive option resident on a remote device. The data signal also causes the processor to receive an input of: a device identifier, a selection of a usage period, and a selection of an inactive option resident on the device for enablement from the GUI. The processor further causes a remote centralized processing station to generate a code configured to enable the selected inactive option resident on the device after successful processing of the received inputs and selectors.

In accordance with yet another aspect of the invention, a GUI to request activation of an inactive software program resident in memory of a medical imaging scanner remotely located from a centralized processing center is disclosed comprising a device modality selector, a system identification field, a user identification field, a software program selector, and a software key generation tab. User selection of the software key generation tab transmits a data transmission to the centralized processing center. The data transmission represents a request to activate the inactive software program resident in memory of the medical imaging scanner.

The present invention has been described in terms of the preferred embodiment, and it is recognized that equivalents, alternatives, and modifications, aside from those expressly stated, are possible and within the scope of the appending claims.

What is claimed is:

1. A method to access one or more inactive options resident on a device remotely located from a centralized facility comprising the steps of:
    accessing a graphical user interface (GUI) electronically linked to a centralized facility and configured to facilitate selection from a number of option identifying parameters;
    selecting at least one of the number of option identifying parameters for identification of one or more inactive options resident on the device;
    transmitting an electronic request for activation of the selected one or more inactive options to the centralized facility, wherein the electronic request is transmitted via a public communication interface; and
    authorizing transmission and installation of a software key in response to the electronic request, wherein the transmission of the software key is via a private communication interface such that the private communication interface electronically connects the centralized facility to the device.

2. The method of claim 1 wherein the software key is configured to activate the one or more inactive options and is transmitted to and installed on the device.

3. The method of claim 1 further including the steps of inputting a system ID, a host ID, a client ID, and a password to gain access to the selection step.

4. The method of claim 1 further comprising the step of formulating the electronic request by:
    inputting a user ID;
    inputting a system ID;
    selecting a modality;
    selecting a software package; and
    selecting a usage period.

5. The method of claim 1 further comprising the step of requesting use of the one or more inactive options for one of a trial period, a pay-per-use period, a limited access period, and an indefinite period.

6. The method of claim 1 further comprising generating a software key if the centralized facility grants access to the inactive option, wherein the software key is unique for each electronic request.

7. The method of claim 2 wherein the software key is an alphanumeric code.

8. An access granting system comprising:
    a computerized network;
    a device having at least one non-enabled software application resident in memory thereon;
    a plurality of computers connected to the computerized network, wherein at least one of the plurality of computers displays selection data to a user in a form of a graphical user interface (GUI);
    a remote centralized facility electronically connected to the device and having a database, wherein the remote centralized facility includes a computer programmed to:
        receive a host ID input, wherein the host ID corresponds to a physical location of the device;
        identify a user selection of the at least one non-enabled software application;
        receive a request from an authorized user requesting enablement of the identified user selection;
        generate a software enabler designed to permit access to the selected non-enabled software application in accordance with the received request; and
        transmit the software enabler from the centralized facility to the device.

9. The system of claim 8 wherein the computer of the centralized facility is further programmed to:
    receive a system ID input;
    identify a modality selection; and
    decide whether to generate and transmit the software enabler based on the host ID input, the system ID input, and the modality selection.

10. The system of claim 8 wherein the computer of the centralized facility is further programmed to compare the request comprising a system ID, a host ID, a user ID, a selected non-enabled software application; and an identified modality to user and device data stored in the database, and generate the software enabler, wherein the software enabler is specific to the request and non-reusable.

11. The system of claim 9 wherein the computer of the centralized facility is further programmed to determine if the user is authorized to operate the selected non-enabled software application.

12. The system of claim 8 wherein the device is a medical component including one of a cardiology device, a computed radiology device, a computed tomography device, a magnetic resonance imaging device, an x-ray device, an ultrasound device, a picture archiving and communication device, a nuclear medicine device, and a positron emission tomography device.

13. The system of claim 8 wherein the GUI is configured to authorize electronic communication between the centralized facility and the device.

14. The system of claim 8 wherein a user selection of a modality causes a list of available software applications to be displayed on the GUI.

15. The system of claim 8 wherein the computer of the centralized facility is further programmed to:
    receive a user ID input; and
    verify authorization of the user ID input to request enablement of the identified user selection.

* * * * *